United States Patent
Cuende Alonso

(10) Patent No.: US 8,537,145 B2
(45) Date of Patent: Sep. 17, 2013

(54) SYSTEM FOR AUTOMATICALLY LOCATING VISIBILITY ZONES

(75) Inventor: Daniel Cuende Alonso, Madrid (ES)

(73) Assignee: Cuende Infometrics, S.A., Madrid (ES)

( * ) Notice: Subject to any disclaimer, the term of this patent is extended or adjusted under 35 U.S.C. 154(b) by 1443 days.

(21) Appl. No.: 10/770,237

(22) Filed: Feb. 2, 2004

(65) Prior Publication Data

US 2004/0158336 A1    Aug. 12, 2004

Related U.S. Application Data

(63) Continuation of application No. PCT/EP02/00337, filed on Jul. 8, 2002.

(30) Foreign Application Priority Data

Aug. 2, 2001 (ES) .................................. 200101819

(51) Int. Cl.
*G09G 5/00* (2006.01)
(52) U.S. Cl.
USPC ............................... 345/204; 345/84; 345/90
(58) Field of Classification Search
USPC .............. 345/1.2–2.3, 87–100, 204, 214, 84; 340/901–905; 356/256; 700/90
See application file for complete search history.

(56) References Cited

U.S. PATENT DOCUMENTS 6,064,318 A * 5/2000 Kirchner et al. .............. 340/905
6,414,650 B1 * 7/2002 Nicholson et al. ............. 345/1.1

FOREIGN PATENT DOCUMENTS

EP    1115010    7/2001

OTHER PUBLICATIONS

Modelos POSTAR, http: www.postar.co.uk\, Applicant states that web site was available since the year 2000.

* cited by examiner

*Primary Examiner* — William Boddie
*Assistant Examiner* — Mansour M Said
(74) *Attorney, Agent, or Firm* — Klauber & Jackson LLC

(57) ABSTRACT

According to the invention, the system automatically locates effective visibility zones from which an element to be viewed is visible. For this purpose, for this purpose, the inventive system makes use of the location of potential visibility zones (obtained from data such as sitting, morphology and orientation of the element to be viewed, potential visibility distance assigned to said element, etc.) and the morphology of the region in which the effective visibility zones are to be located. Said system avails of means of appraising the degree of visibility of different visibility zones according to the level of compliance achieved in relation to the criteria for locating visibility zones. By means of a sample practical application, the element to be viewed could be an advertising medium and the effective visibility zones could be defined by effective visibility axes that correspond to the streets of an urban environment in which other parameters can also be considered, such as the number of individuals and the transport means that pass through said streets, the direction of traffic, the time, etc.

11 Claims, 11 Drawing Sheets

SYSTEM FOR AUTOMATICALLY LOCATING VISIBILITY ZONES

RELATED APPLICATIONS

The present application is a Continuation of copending PCT Application No. PCT/ES02/00337, filed Jul. 8, 2002 which in turn, claims priority from Spanish Application Serial No. 200101819, filed Aug. 2, 2001. Applicants claim the benefits of 35 U.S.C. §120 as to the PCT application and priority under 35 U.S.C. §119 as to said Spanish application, and the entire disclosures of both applications are incorporated herein by reference in their entireties.

OBJECT OF THE INVENTION

The automatic visibility zone locating system serves the purpose of providing objectivity, immediacy, personalization and precision for a task necessary for measuring the visibility of an element within an environment which may be that of a city, an airport, a station or anywhere that can be mapped.

Thanks to the computer application integrated into said system, the axes of the streets from which an advertising medium would be viewed are immediately available, taking into account the course in which the individuals are moving, the angle at which the shop window or advertising poster is situated, the height and size thereof, the necessary degree of legibility and the arc allowing the medium in question to be seen "frontally" for optimum legibility.

This computer application also takes into account the obstacles which may hinder visibility, the shape of the block where the bill in question is located, the height of the different elements, the shape of the buildings in the surrounding zone, shielding problems . . . . This application also takes into account the speed at which the individuals and the means of transport are moving in order to determine the lapses of time each is exposed to the same, as well as their viewing angle of the medium in question.

It is only necessary to create or mark a point, a line or a polygon representing the poster in question, its orientation and its size on the digital mapping; and the visibility zone locating system will automatically locate all the segments or axes of the streets where said point will be able to be read or seen, the course in which said axes will have to be traveled in order for the advertising poster to be visible frontally and/or optimally, the percentage of effective frontal and/or optimum visibility of the advertising medium, the space of the axis on which the actual frontal and/or optimum visibility occurs, . . . .

BACKGROUND OF THE INVENTION

To date, determining from what points along a street it would be possible to view an advertising medium, a shop window or a signal had to be done manually. In countries where existed this need of determining the audience viewing an advertising medium (countries such as France, where an "affimetrie" study was conducted), a committee of persons was formed to decide, point by point, from what streets and from what positions a certain medium could be viewed. This entails a major manual task workload in addition to the subjectivity-related problems involved. The lack of immediacy and precision in the results is yet another problem, as it takes a long time for the human teams to complete the assigning of axes to the streets for all of the advertising media in the country (shop windows, automatic cash points, branch banks, etc.) employing the same criteria. Nor can personalized analyses be made if some characteristics, such as day or night or the reading distance are changed.

Another additional drawback is that the visibility zones can be irregular in shape and depend upon many different parameters. Furthermore, no system has been implemented to date which functions automatically taking three dimensions into account.

DESCRIPTION OF THE INVENTION

The system for automatically locating visibility zones from which an element to be viewed is visible (denominated as effective visibility zones), is wherein it comprises at least a computer application with means to locate said potential and effective visibility zones by means of a set of visibility zone locating criteria comprising:
  at least one item of data about an element to be viewed selected from location, morphology, orientation and combinations thereof, with which the potential visibility zone locating means automatically locate at least a potential visibility zone assigned to the element to be viewed, and
  at least one visibility study region mapped and stored on a computer-readable medium with which, as function of the said potential visibility zone, the effective visibility zone locating means automatically locate effective visibility zones selected from effective visibility areas, effective visibility axes and combinations thereof, from which the element to be viewed is visible.

The set of visibility zone locating criteria additionally can be provided with other visibility zone locating criteria selected from:
  legibility of the element to be viewed,
  movement of the element to be viewed,
  lighting of the element to be viewed,
  morphology of the visibility study region,
  at least one potential visibility distance assigned to the element to be viewed as function of its morphology,
  at least one potential visibility distance assigned to the element to be viewed,
  at least one potential visibility distance assigned to the element to be viewed as function of its size,
  at least one potential visibility distance assigned to the element to be viewed as function of at least one viewing time,
  at least one potential visibility distance assigned to the element to be viewed as function of at least one viewing date,
  percentage of visibility of the element to be viewed,
  at least one potential visibility angle assigned to the element to be viewed, selected from horizontal angles, vertical angles and combinations thereof,
  at least one potential visibility angle assigned to the element to be viewed as function of at least one viewing time, said potential visibility angle being selected from horizontal angles, vertical angles and combinations thereof,
  at least one potential visibility angle assigned to the element to be viewed as function of at least one viewing date, said potential visibility angle being selected from horizontal angles, vertical angles and combinations thereof,
  at least one optimum potential visibility angle assigned to the element to be viewed, selected from horizontal angles, vertical angles and combinations thereof,
  at least one optimum potential visibility angle assigned to the element to be viewed as function of at least one viewing time, said potential visibility angle being selected from horizontal angles, vertical angles and combinations thereof, at least one optimum potential visibility angle assigned to the element to be viewed as function of at least one viewing date, said potential visibility angle being selected from horizontal angles, vertical angles and combinations thereof, at least one optimum potential visibility distance assigned to the element to be viewed, at least one optimum potential visibility distance assigned to the element to be viewed as function of its size, at least one optimum potential visibility angle assigned to the element to be viewed as function of at least one viewing time, at least one optimum potential visibility angle assigned to the element to be viewed as function of at least one viewing date, at least one lapse of viewing time of the element to be viewed, selected from maximum viewing time, minimum viewing time and combinations thereof, at least one lapse of viewing time of the element to be viewed, as function of its morphology, said lapse of viewing time being selected from maximum viewing time, minimum viewing time and combinations thereof, at least one lapse of viewing time of the element to be viewed, as function of at least one viewing time, said lapse of viewing time being selected from maximum viewing time, minimum viewing time and combinations thereof, at least one lapse of viewing time of the element to be viewed, as function of at least one viewing date, said lapse of viewing time being selected from maximum viewing time, minimum viewing time and combinations thereof, at least one lapse of viewing time of the element to be viewed, as function of at least one means of transport which moves at least partially through the visibility study region, said lapse of viewing time being selected from maximum viewing time, minimum viewing time and combinations thereof, direction and course of at least one individual moving at least partially through the visibility study region, direction and course of at least one means of transport moving at least partially through the visibility study region, average moving speed of at least one means of transport which moves at least partially through the visibility study region, degree of visibility from at least one means of transport which moves at least partially through the visibility study region, estimate of the number of individuals present in a determined zone of the visibility study region per unit of time, as function of at least one of the following sub-criteria: location, time, date, direction and course of moving and combinations thereof, estimate of the number of means of transport present in a determined zone of the visibility study region per unit of as function of at least one of the following sub-criteria: location, time, date, direction and course of moving, capacity of the means of transport, degree of occupation of the means of transport and combinations thereof, degree of interference with the visibility of the element to be viewed due to temporary interposition of other elements, and combinations thereof.

The computer application is provided with means for configuring at least one visibility zone locating criterion, said means of configuration being selected from: manual configuration, default configuration, configuration by extrapolation from visibility study regions with a similar morphology, configuration by visibility optimization criteria and combinations thereof. As an alternative source to obtain at least one visibility zone locating criterion, the computer application can access to at least one database in which at least one visibility criterion of at least one geographical location is stored.

The zones of visibility that have been located, are shown in at least one format selected from: at least one computer file compatible with at least one computer application, at least one image of the visibility study region where the visibility zones located are shown highlighted, a list of the visibility zones located, at least one mapping layer with associated information and combinations thereof.

Also, the computer application comprises means for evaluating the degree of visibility of different visibility zones, as function of the degree of achievement of at least one of the criteria of locating visibility zones.

More specifically, the effective visibility zones can be defined by effective visibility axes from which the element to be viewed is visible; even they can be additionally defined by at least one characteristic selected from: a course of effective visibility which specifies the course in which the effective visibility axis has to be traveled in order to view the element to be viewed frontally and/or optimally, a frontal and/or optimum effective visibility space and combinations thereof.

More particularly, the visibility study region can comprise at least partially, by an urban environment where the effective visibility zones are defined by effective visibility axes, courses of frontal and/or optimum effective visibility and frontal and/or optimum effective visibility spaces corresponding to urban streets.

The system for automatically locate visibility zones comprises a computer application provided with a module of "assignment of effective visibility axes, courses of effective visibility" provided with means of locating effective visibility axes, frontal and/or optimum effective visibility courses and frontal and/or optimum effective visibility spaces, that enable to view the element to be viewed, by means of at least one input parameter selected from: at least one potential visibility angle assigned to the element to be viewed, at least one optimum potential visibility angle assigned to the element to be viewed, at least one potential visibility distance assigned to the element to be viewed, at least one optimum potential visibility distance assigned to the element to be viewed, morphology of the visibility study region, morphology and orientation of the element to be viewed, course of movement of individual and means of transport, plans of the visibility study region, visibility zone location criteria and combinations thereof.

Within the module of "assignment of effective visibility axes" and comprising an integral part thereof, the computer application comprises:

at least one module of "collection of mapping information" provided with means for locating potential visibility zones comprising spaces selected from potential visibility cones, portions of potential visibility spheres, zones of potential visibility and combinations thereof; and for generating mapping layers of the visibility study region contained by at least one potential visibility zone, by means of at least one input parameter selected from: morphology of the element to be viewed, morphology of the visibility study region, at least one potential visibility angle assigned to the element to be viewed, at least one optimum potential visibility angle assigned to the element to be viewed, at least one potential visibility distance assigned to the element to be viewed, at least one optimum potential visibility distance assigned to the element to be viewed, plans of the visibility study region, visibility zone locating criteria and combinations thereof; and at least one module of "location of effective visibility axes and effective visibility courses", by means of at least one input parameter selected from: potential visibility zone and mapping layer generated by the module of "collection of mapping information", morphology and orientation of the element to be viewed, course of movement of the individuals and of the means of transport, visibility zone locating criteria and combinations thereof.

Within the module of "collection of mapping information" and comprising an integral part thereof, the computer application comprises:

at least one module of "location of potential visibility zones", by means of at least one input parameter selected from: morphology and orientation of the element to be viewed, at least one potential visibility angle assigned to the element to be viewed, at least one potential visibility distance assigned to the element to be viewed, at least one optimum potential visibility angle assigned to the element to be viewed, at least one optimum potential visibility distance assigned to the element to be viewed and combinations thereof;

at least one module of "location of potential visibility axes on a background map" by means of at least one input parameter selected from: visibility study region plans, urban environment and combinations thereof; and at least one module of "generation of mapping layers", by means of at least one input parameter selected from: potential visibility zones located by the module of "location of potential visibility zones", potential visibility axes on a background map generated by the module of "location of potential visibility axes on a background map", and combinations thereof.

Within the module of "location of effective visibility axes and effective visibility courses" and comprising an integral part thereof, the computer application comprises:

at least one module of "location of effective visibility axes", by means of at least one input parameter selected from: potential visibility zone and mapping layer generated by the module of "collection of mapping information", morphology and orientation of the element to be viewed and combinations thereof; and at least one module of "determination of the course of effective visibility", by means of at least one input parameter selected from: at least one effective visibility axis located by the module of "location of potential visibility axes", course of movement of individuals and means of transport, morphology and orientation of the element to be viewed, visibility zone locating criteria and combinations thereof.

Figure 1:
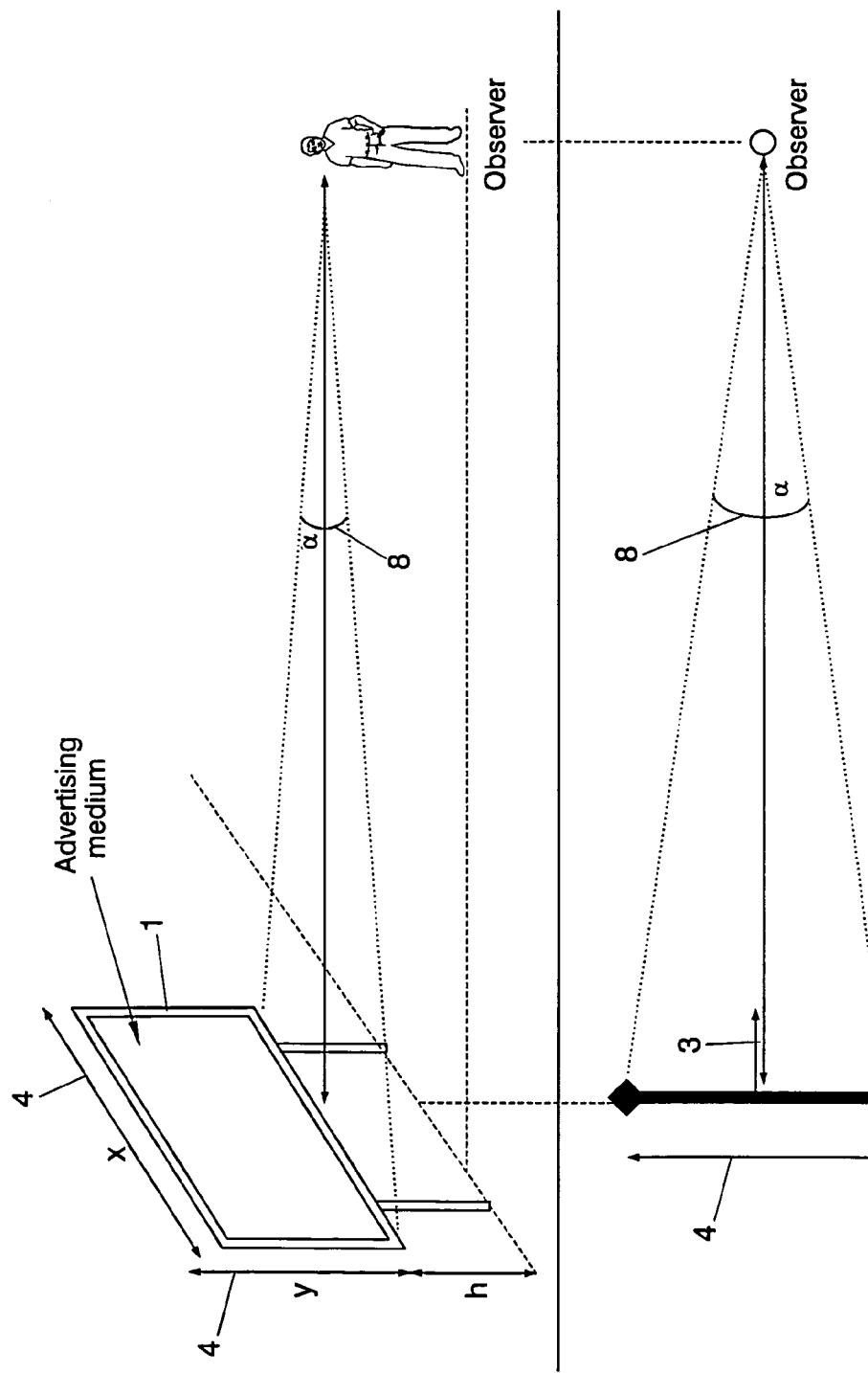
FIG. 1 illustrates an element to be viewed (1), its dimensions (4), its orientation (3), a visibility distance to an observer and a potential visibility angle (8).
Figure 2:
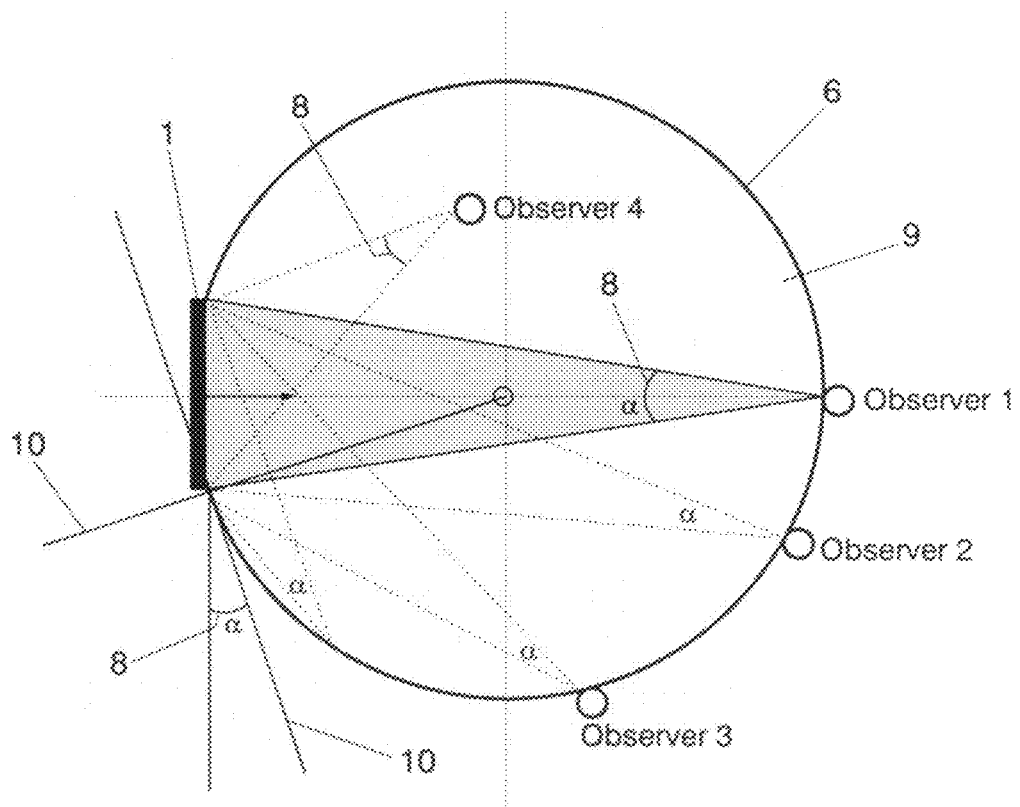
FIG. 2 illustrates a maximum visibility distance (6), a potential visibility zone (9), the element to be viewed (1), potential visibility axes (10), four observers 1, 2, 3 and 4, theirs potential visibility angles (8), where the potential visibility angle of the fourth observer is the biggest one.
Figure 3:
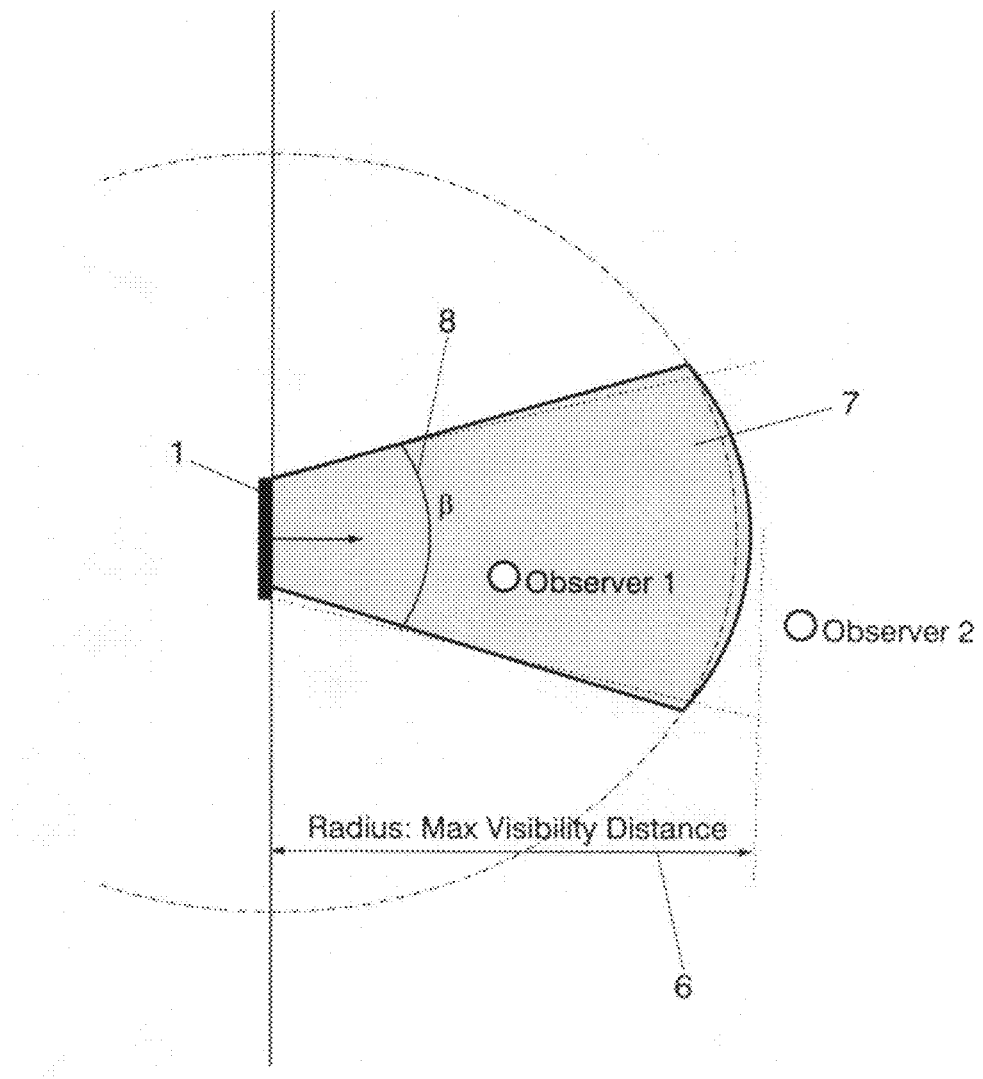

FIG. 3 illustrates a potential visibility cone (7), the advertising medium (1), a maximum visibility distance (6), a potential visibility angle (8) and two observers 1 and 2. While observer 1 is inside the potential visibility cone (7) and therefore can see the advertising medium, observer 2 is outside the potential visibility cone (7) and can not see the advertising medium properly.

Figure 4:
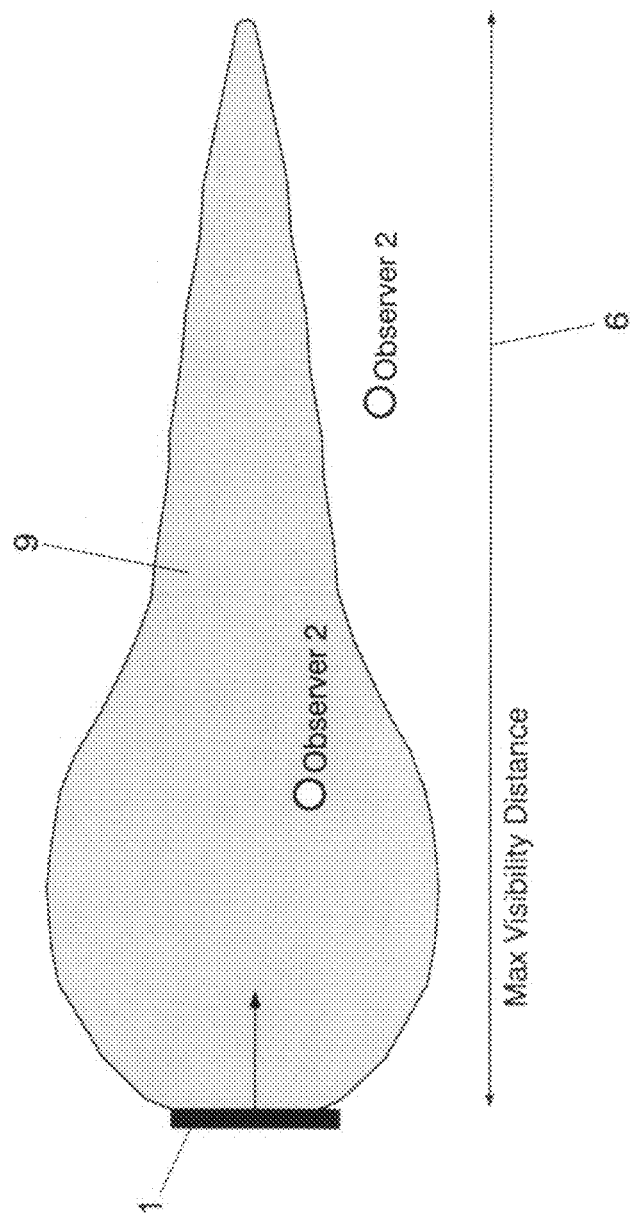

FIG. 4 illustrates a potential visibility zone (9) defined by a user or obtained from a specific research. An element to be viewed (1), a maximum visibility distance (6) and observer 1 and 2.

Figure 5:
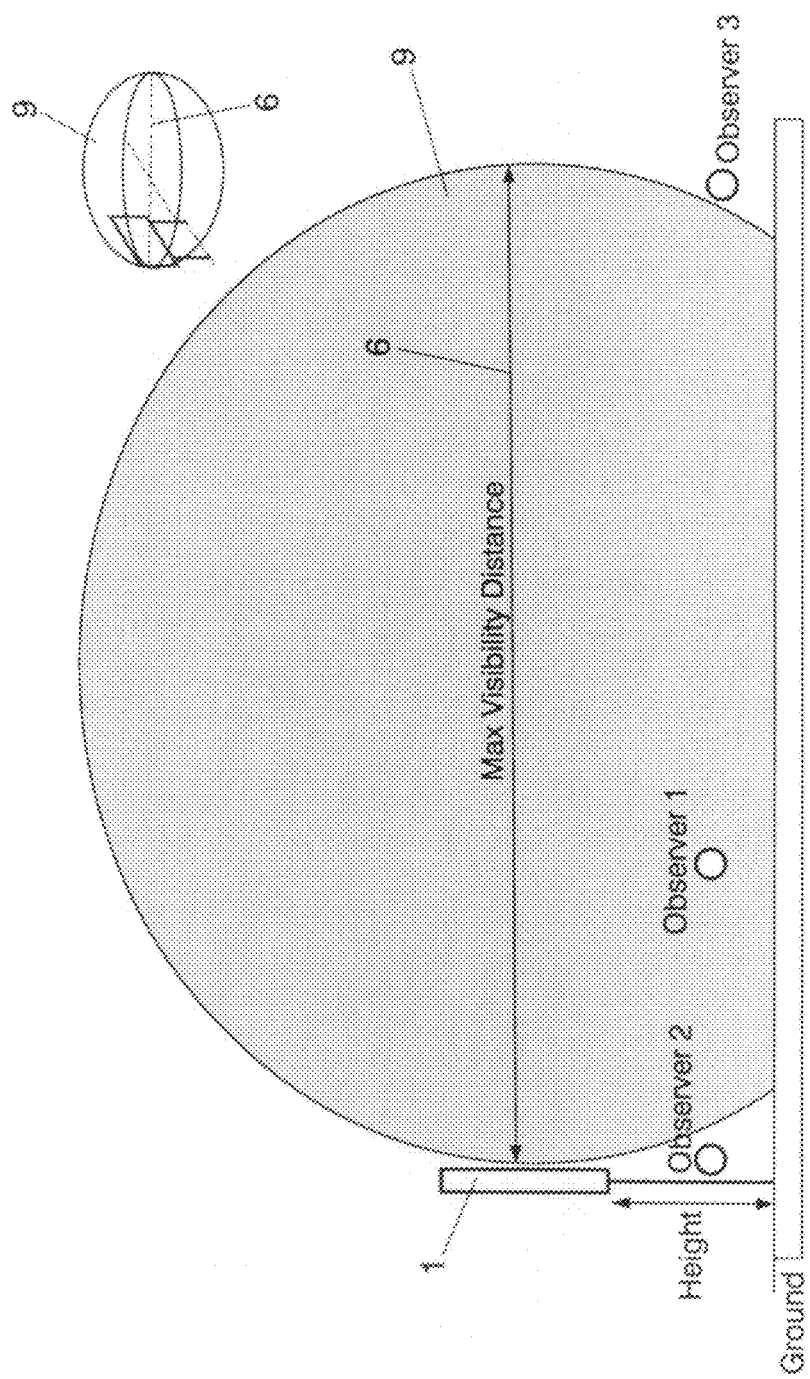

FIG. 5 illustrates a potential visibility zone (9) in a three-dimensions representation, an element to be viewed (1), a maximum visibility distance (6) and observer 1, 2 and 3. Observers 2 and 3 are not able to see the advertising medium properly.

Figure 6:
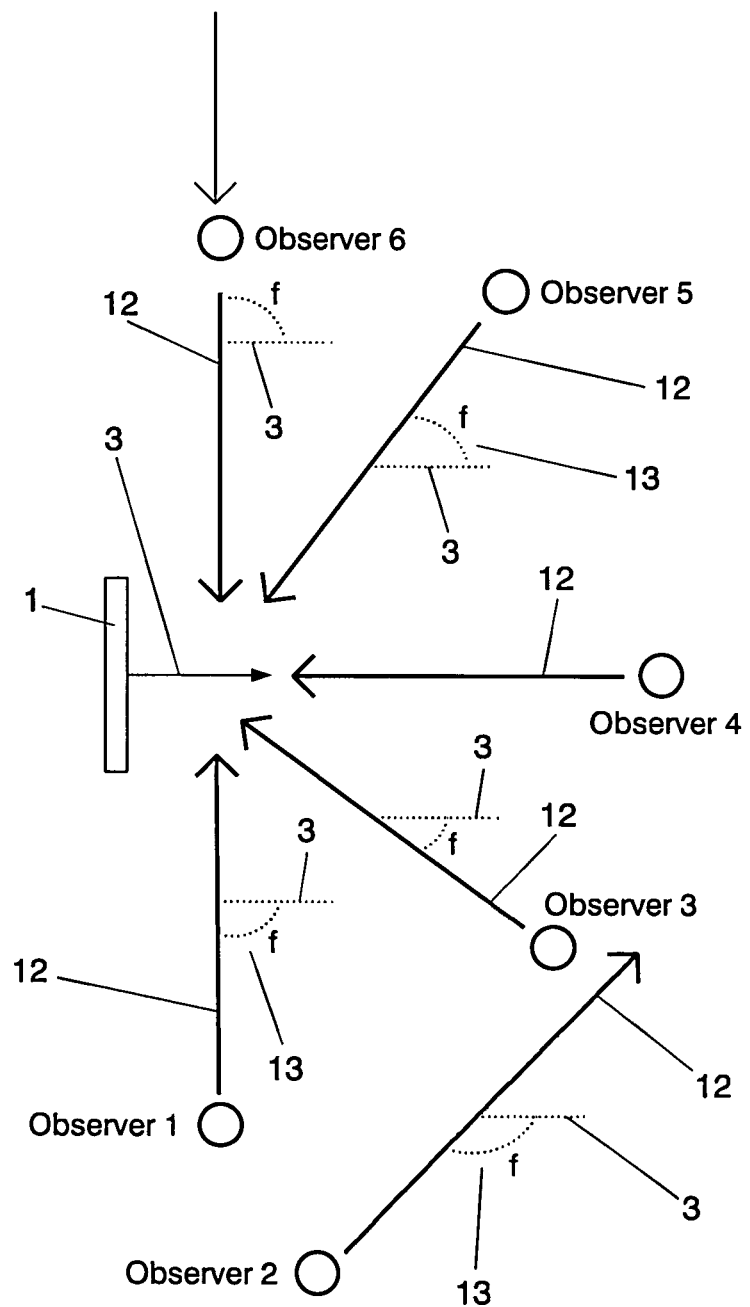

FIG. 6 illustrates advertising medium orientation (3), observers 1-6, observer orientations (12), which are determined by observers movement directions, and the observer orientation angle (13) determined by the advertising medium orientation (3) and observers orientations (12).

Figure 7:
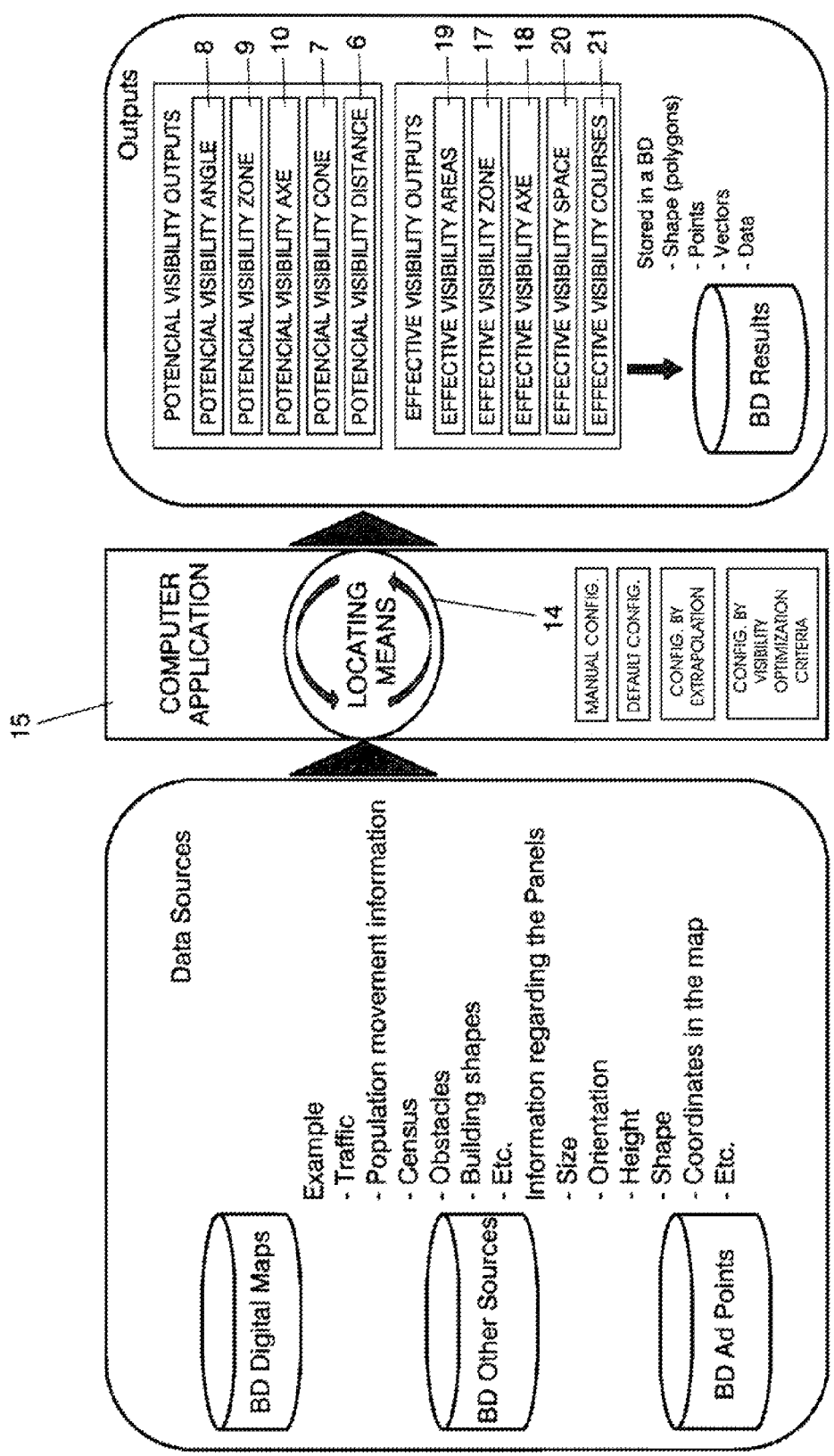

FIG. 7 is a flowchart illustrating operation of a computer application (15) and the locating means (14) therein. Said locating means enables to locate the potential visibility angle (8), zone (9), axe (10), and the effective visibility zone (17), axe (18), areas (19), space (20), courses (21) from the data about the element to be viewed.

Figure 8A:
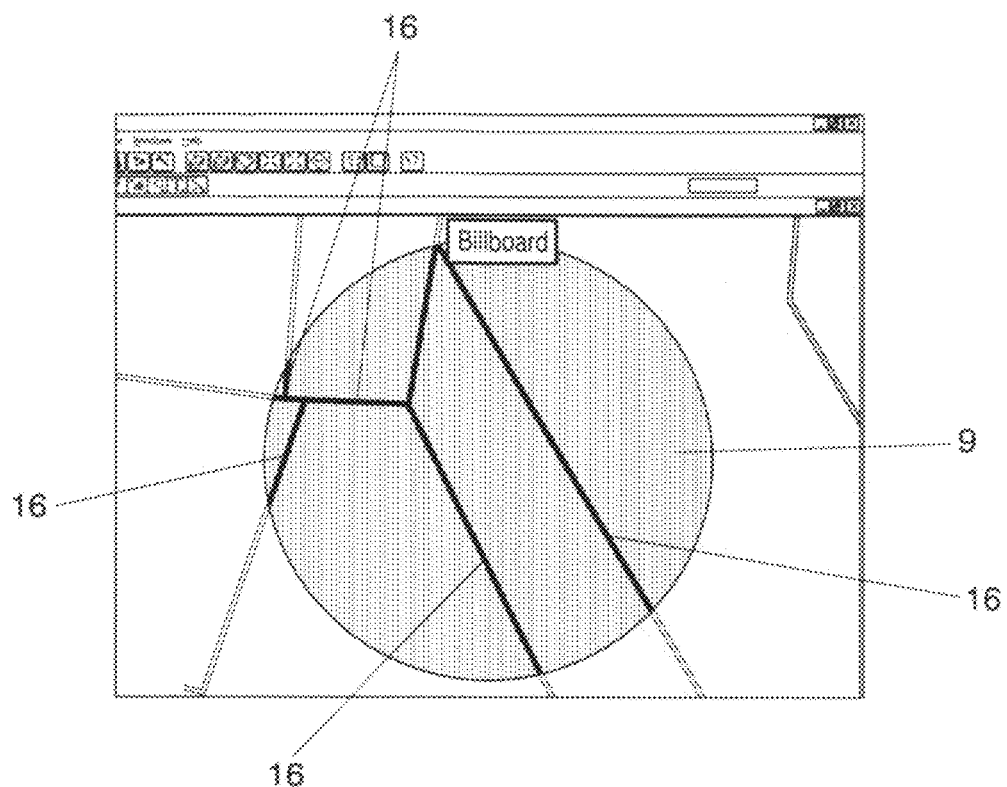

FIG. 8A illustrates the potential visibility zone (9) using only the street axis (16) with navigational information stored on a computer-readable medium.

Figure 8B:
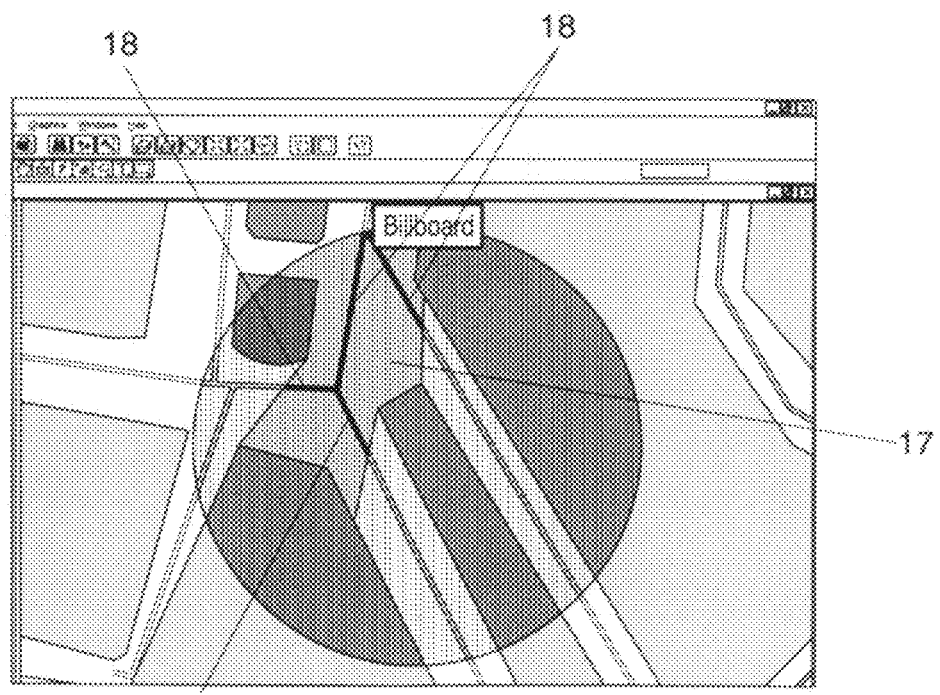

FIG. 8B illustrates an effective visibility zone (17), and effective visibility axes (18) which is the resulting buildings.

Figure 9A:
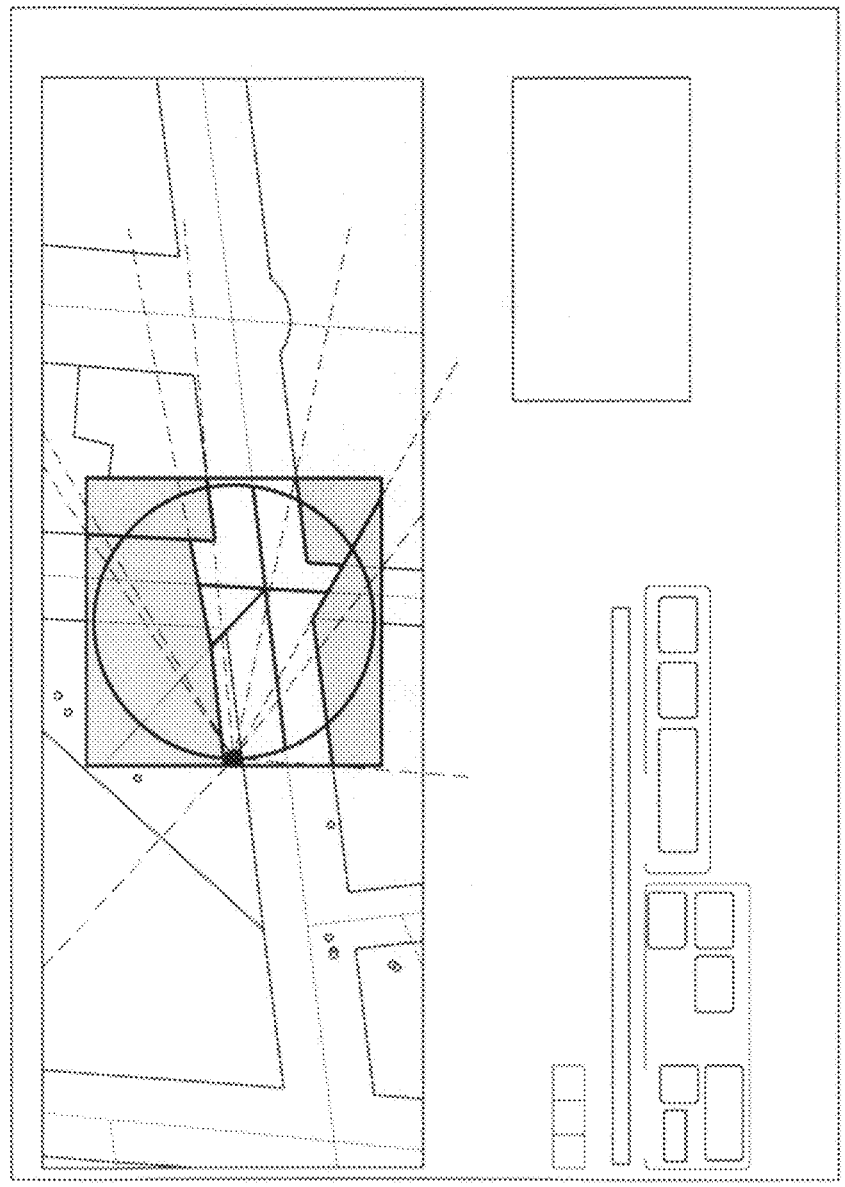
Figure 9B:
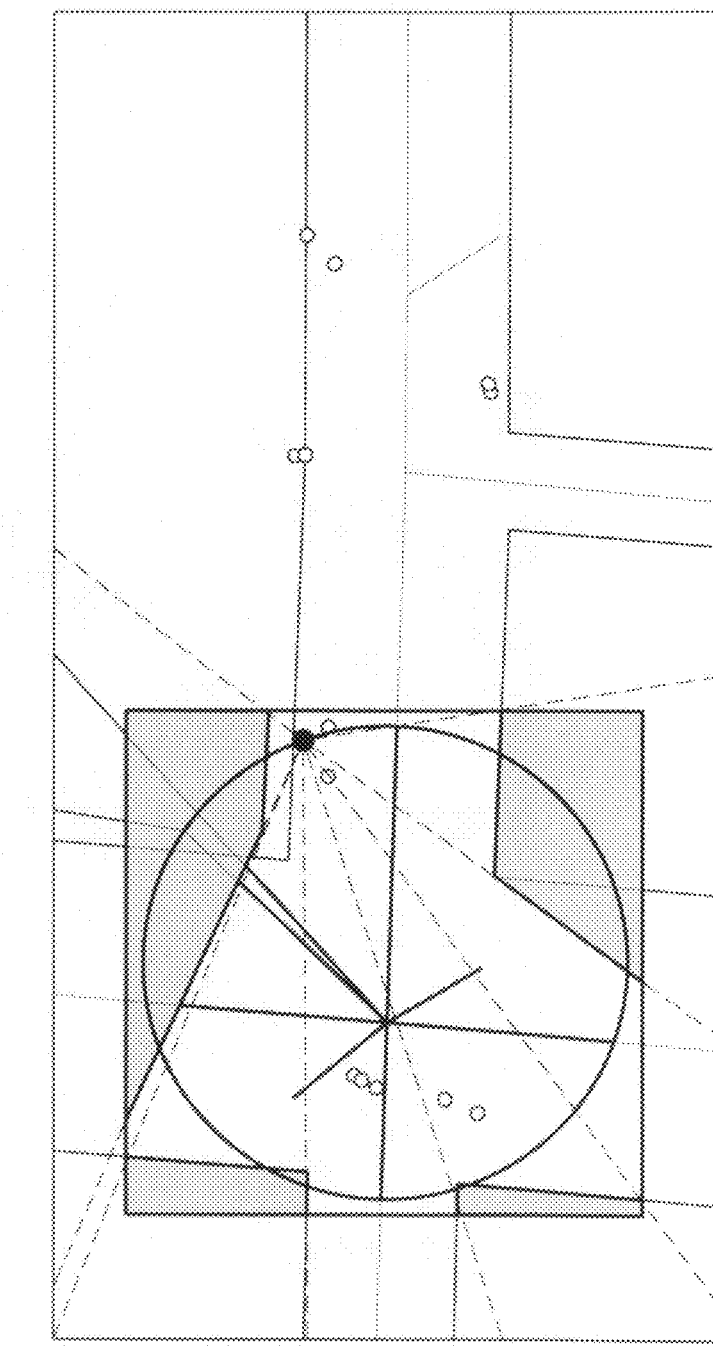
Figure 9C:
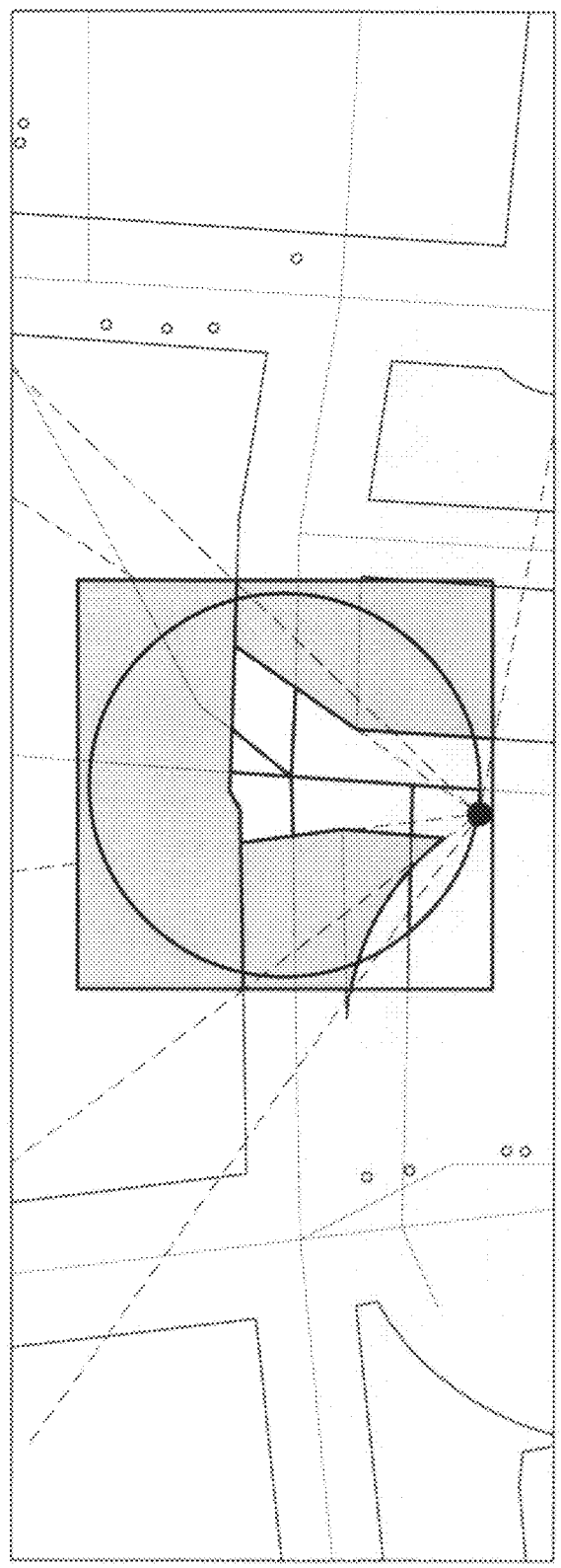

FIGS. 9A, 9B and 9C illustrate real example in 2D of the present invention.

DESCRIPTION OF AN EMBODIMENT OF THE INVENTION

The present invention may be implemented in different embodiments and has many different fields of application: the visibility study region may be any geographical point regardless of its dimensions (a population center, an airport terminal, . . . ) and the element to be viewed may be any person or object intended to be located in a strategic zone or for which the degree of visibility of the location thereof (advertising medium, shop window, informative poster, . . . ) is intended to be evaluated.

Next, it is described the functioning way of one of the possible embodiments of the invention, said description not being limiting of other possible ways of functioning.

As input parameters, the system takes all of the information related to the visibility criteria for a certain advertising medium (point to be viewed) such as its location, orientation, dimensions, type of medium, . . . .

The system calculates the values of one or more visibility distances, the size of the area of influence (potential visibility cone), . . . specifically for said advertising medium.

Also as input parameters, the system takes all of the information related to the urban environment visibility criteria (visibility study region) mapped and stored on a computer-readable medium or, if necessary, in absence of information, it extrapolates said information from a similar zone. Other possible input parameters may be comprised by parametrizable visibility optimization criteria (greater visibility, greater frontal visibility, longer viewing time, greater degree of viewing closeness, . . . ) Said information comprises: location, shape and height of the buildings, course in which the urban street are traveled, estimate of the number of people using these streets, . . . .

On said urban environment, the system plots the area of influence of the aforementioned advertising medium.

By means of computer processing, the systems makes a detailed analysis of the urban environment mapped and stored on a computer-readable medium for determining whether there are zones preventing the advertising medium from being visible.

The system scans the entire area of influence (potential visibility cone) of the advertising medium, intersecting with all of the obstacles that prevent the visibility of said advertising medium (buildings, trees, party walls, . . . ).

The system generates at least one new silhouette (effective visibility zone and/or optimum effective visibility zone) defined by the surface area scanned by the beams up to the point of intersecting with obstacle elements that hinder visibility or up to the point of maximum visibility distance for said advertising medium.

The system locates the urban streets falling within the visibility zone and which comprise the visibility axes.

The system makes a vectorial, angular or by coordinates analysis in order to calculate the angle defined by the direction of each urban street and by the orientation of the advertising medium (defined as function of the morphology of said advertising medium). Thus, the system calculates the course of travel for each street in order for the advertising medium to be visible frontally and/or optimally, as well as the frontal and/or optimum visibility space for each axis and the frontal and/or optimum percentage of visibility for said axes with respect to the advertising medium in question.

By means of images, listings, mapping layers or computer files compatible with other computer applications, the system shows the urban streets from which the advertising medium is visible, indicating the course of travel, space and percentage of frontal and/or optimum effective visibility to view the advertising medium can be seen.

Optionally, the information generated by the system can be stored in a database for later processing or crossed with other information including estimates about the number of individuals subject to seeing said point and, thanks to said information, be able to calculate audiences and coverages.

The system also provides a display tool enabling to see how the different input parameters affect on the final result.

The process is repeated by the system for each visibility criterion which changes the different input parameters, such as the potential visibility distance or distances, the time, optimum legibility, etc.

The invention claimed is:

1. A non-transitory computer readable medium embodying a computer application for automatically locating visibility zones from which an element (1) to be viewed is visible, wherein it comprises at least a computer application (15) provided with locating means (14) that enable to locate potential (9) and effective (17) visibility zones by means of a set of visibility zone locating criteria comprising:

at least one item of data about the element (1) to be viewed selected from location (2), morphology, orientation (3) and combinations thereof, with which the potential visibility zone locating means (14) automatically locate at least one potential visibility zone (9) assigned to the element to be viewed (1), and at least one visibility study region mapped and stored with which, as function of the said potential visibility zone (9), the effective visibility zone locating means (14) automatically locate effective visibility zones (17) selected from effective visibility areas (19), effective visibility axes (18) and combinations thereof, from which the element to be viewed is visible;

and wherein the computer application further comprises means for configuring at least three visibility zone locating criterion, said means of configuration being selected from: manual configuration, default configuration, configuration by extrapolation from visibility study regions with a similar morphology, configuration by visibility optimization criteria and combinations thereof and wherein the set of visibility zone locating criteria further comprises at least three visibility zone locating criterion selected from:

legibility of the element to be viewed, movement of the element to be viewed, lighting of the element to be viewed, morphology of the visibility study region, at least one potential visibility distance (6) assigned to the element to be viewed, at least one potential visibility distance (6) assigned to the element to be viewed as function of its morphology, at least one potential visibility distance (6) assigned to the element to be viewed as function of its size, at least one potential visibility distance (6) assigned to the element to be viewed as function of at least one viewing time, at least one potential visibility distance (6) assigned to the element to be viewed as function of at least one viewing date, percentage of visibility of the element to be viewed, at least one potential visibility angle (8) assigned to the element to be viewed, selected from horizontal angles, vertical angles and combinations thereof, at least one potential visibility angle (8) assigned to the element to be viewed as function of at least one viewing time, said potential visibility angle (8) being selected from horizontal angles, vertical angles and combinations thereof, at least one potential visibility angle (8) assigned to the element to be viewed as function of at least one viewing date, said potential visibility angle (8) being selected from horizontal angles, vertical angles and combinations thereof, at least one optimum potential visibility angle (8) assigned to the element to be viewed, selected from horizontal angles, vertical angles and combinations thereof, at least one optimum potential visibility angle (8) assigned to the element to be viewed as function of at least one viewing time, said potential visibility angle being selected from horizontal angles, vertical angles and combinations thereof, at least one optimum potential visibility angle (8) assigned to the element to be viewed as function of at least one viewing date, said potential visibility angle being selected from horizontal angles, vertical angles and combinations thereof, at least one optimum potential visibility distance (6) assigned to the element to be viewed, at least one optimum potential visibility distance (6) assigned to the element to be viewed as function of its size, at least one optimum potential visibility angle (8) assigned to the element to be viewed as function of at least one viewing time, at least one optimum potential visibility angle (8) assigned to the element to be viewed as function of at least one viewing date, at least one lapse of viewing time of the element to be viewed, selected from maximum viewing time, minimum viewing time and combinations thereof, at least one lapse of viewing time of the element to be viewed, as function of its morphology, said lapse of viewing time being selected from maximum viewing time, minimum viewing time and combinations thereof, at least one lapse of viewing time of the element to be viewed, as function of at least one viewing time, said lapse of viewing time being selected from maximum viewing time, minimum viewing time and combinations thereof, at least one lapse of viewing time of the element to be viewed, as function of at least one viewing date, said lapse of viewing time being selected from maximum viewing time, minimum viewing time and combinations thereof, at least one lapse of viewing time of the element to be viewed, as function of at least one means of transport which moves at least partially through the visibility study region, said lapse of viewing time being selected from maximum viewing time, minimum viewing time and combinations thereof, direction (12) and course of at least one individual moving at least partially through the visibility study region, direction (12) and course of at least one means of transport moving at least partially through the visibility study region, average moving speed of at least one means of transport which moves at least partially through the visibility study region, degree of visibility from at least one means of transport which moves at least partially through the visibility study region, estimate of the number of individuals present in a determined zone of the visibility study region per unit of time, as function of at least one of the following sub-criteria: location, time, date, direction and course of moving and combinations thereof, estimate of the number of means of transport present in a determined zone of the visibility study region per unit of as function of at least one of the following sub-criteria: location, time, date, direction and course of moving, capacity of the means of transport, degree of occupation of the means of transport and combinations thereof, degree of interference with the visibility of the element to be viewed due to temporary interposition of other elements, and combinations thereof.

2. The computer system of claim 1, wherein for obtaining at least one visibility zone locating criterion, the computer application access to at least one database in which at least one visibility criterion of at least one geographical location is stored.

3. The computer system of claim 2, wherein the computer application (15) is provided with means for showing the visibility zones located, in at least one format selected from: at least one computer file compatible with at least one computer application (15), at least one image of the visibility study region where the visibility zones located are shown highlighted, a list of the visibility zones located, at least one mapping layer with associated information and combinations thereof.

4. The computer system of claim 3, wherein the computer application (15) comprises means for evaluating the degree of visibility of different visibility zones, as function of the degree of achievement of at least one of the criteria of locating visibility zones.

5. The computer system of claim 4, wherein the effective visibility zones (17) are defined by effective visibility axes (18) from which the element to be viewed is visible.

6. The computer system of claim 5, wherein the effective visibility zones (17) are additionally defined by at least one characteristic selected from: a course of effective visibility which specifies the course in which the effective visibility axis has to be traveled in order to view the element to be viewed, a frontal effective visibility space (20) and combinations thereof.

7. The computer system of claim 6, wherein the visibility study region comprises, at least partially, an urban environment where the effective visibility zones (17) are defined by effective visibility axes (18), courses (21) of effective visibility and frontal effective visibility spaces (20) corresponding to urban streets.

8. The computer system of claim 7, wherein the computer application (15) comprises a module of "assignment of effective visibility axes" provided with means of locating effective visibility axes, effective visibility courses and frontal effective visibility spaces (20), that enable to view the element to be viewed, by means of at least one input parameter selected from: at least one potential visibility angle (8) assigned to the element to be viewed, at least one potential visibility distance (6) assigned to the element to be viewed, at least one optimum potential visibility angle (8) assigned to the element (1) to be viewed, at least one optimum potential visibility distance (6) assigned to the element to be viewed, morphology of the visibility study region, morphology and orientation of the element to be viewed, course of movement of individual and means of transport, plans of the visibility study region, visibility zone location criteria and combinations thereof.

9. The computer system of claim 8, wherein within the module of "assignment of effective visibility axes" and comprising an integral part thereof, the computer application (15) comprises:

at least one module of "collection of mapping information" provided with means for locating potential visibility zones comprising spaces selected from potential visibility cones, portions of potential visibility spheres, zones of potential visibility and combinations thereof; and for generating mapping layers of the visibility study region contained by at least one potential visibility zone, by means of at least one input parameter selected from: morphology of the element to be viewed, morphology of the visibility study region, at least one potential visibility angle assigned to the element to be viewed, at least one potential visibility distance assigned to the element to be viewed, at least one optimum potential visibility angle assigned to the element to be viewed, at least one optimum potential visibility distance assigned to the element to be viewed, plans of the visibility study region, visibility zone locating criteria and combinations thereof and at least one module of "location of effective visibility axes and effective visibility courses", by means of at least one input parameter selected from: potential visibility zone and mapping layer generated by the module of "collection of mapping information", morphology and orientation of the element to be viewed, course of movement of the individuals and of the means of transport, visibility zone locating criteria and combinations thereof.

10. The computer system of claim 9, wherein within the module of "collection of mapping information" and comprising an integral part thereof, the computer application comprises:

at least one module of "location of potential visibility zones", by means of at least one input parameter selected from: morphology and orientation (3) of the element to be viewed, at least one potential visibility angle (8) assigned to the element to be viewed, at least one potential visibility distance (6) assigned to the element to be viewed, at least one optimum potential visibility angle (8) assigned to the element to be viewed, at least one optimum potential visibility distance (6) assigned to the element to be viewed and combinations thereof;

at least one module of "location of potential visibility axes on a background map" by means of at least one input parameter selected from: visibility study region plans, urban environment and combinations thereof; and at least one module of "generation of mapping layers", by means of at least one input parameter selected from: potential visibility zones located by the module of "location of potential visibility zones", potential visibility axes on a background map generated by the module of "location of potential visibility axes on a background map", and combinations thereof.

11. The computer system of claim 9, wherein within the module of "location of effective visibility axes and effective visibility courses" and comprising an integral part thereof, the computer application (15) comprises:

at least one module of "location of effective visibility axes", by means of at least one input parameter selected from: potential visibility zone (9) and mapping layer generated by the module of "collection of mapping information", morphology and orientation (3) of the element to be viewed and combinations thereof; and at least one module of "determination of the course of effective visibility", by means of at least one input parameter selected from: at least one effective visibility axis (18) located by the module of "location of potential visibility axes", course of movement of individuals and means of transport, morphology and orientation of the element to be viewed, visibility zone locating criteria and combinations thereof.

* * * * *

UNITED STATES PATENT AND TRADEMARK OFFICE
CERTIFICATE OF CORRECTION

| | |
|---|---|
| PATENT NO. | : 8,537,145 B2 |
| APPLICATION NO. | : 10/770237 |
| DATED | : September 17, 2013 |
| INVENTOR(S) | : Daniel Cuende Alonso |

It is certified that error appears in the above-identified patent and that said Letters Patent is hereby corrected as shown below:

Title Page

Under Related U.S. Application Data, it should read:

(63) Continuation of application no. PCT/ES02/00337, filed on Jul. 8, 2002.

Signed and Sealed this
Twenty-second Day of April, 2014

Michelle K. Lee
*Deputy Director of the United States Patent and Trademark Office*